June 24, 1930.  R. V. RITCHEY  1,768,332
FABRIC BAND EXPANDER
Filed Nov. 17, 1927  2 Sheets-Sheet 1
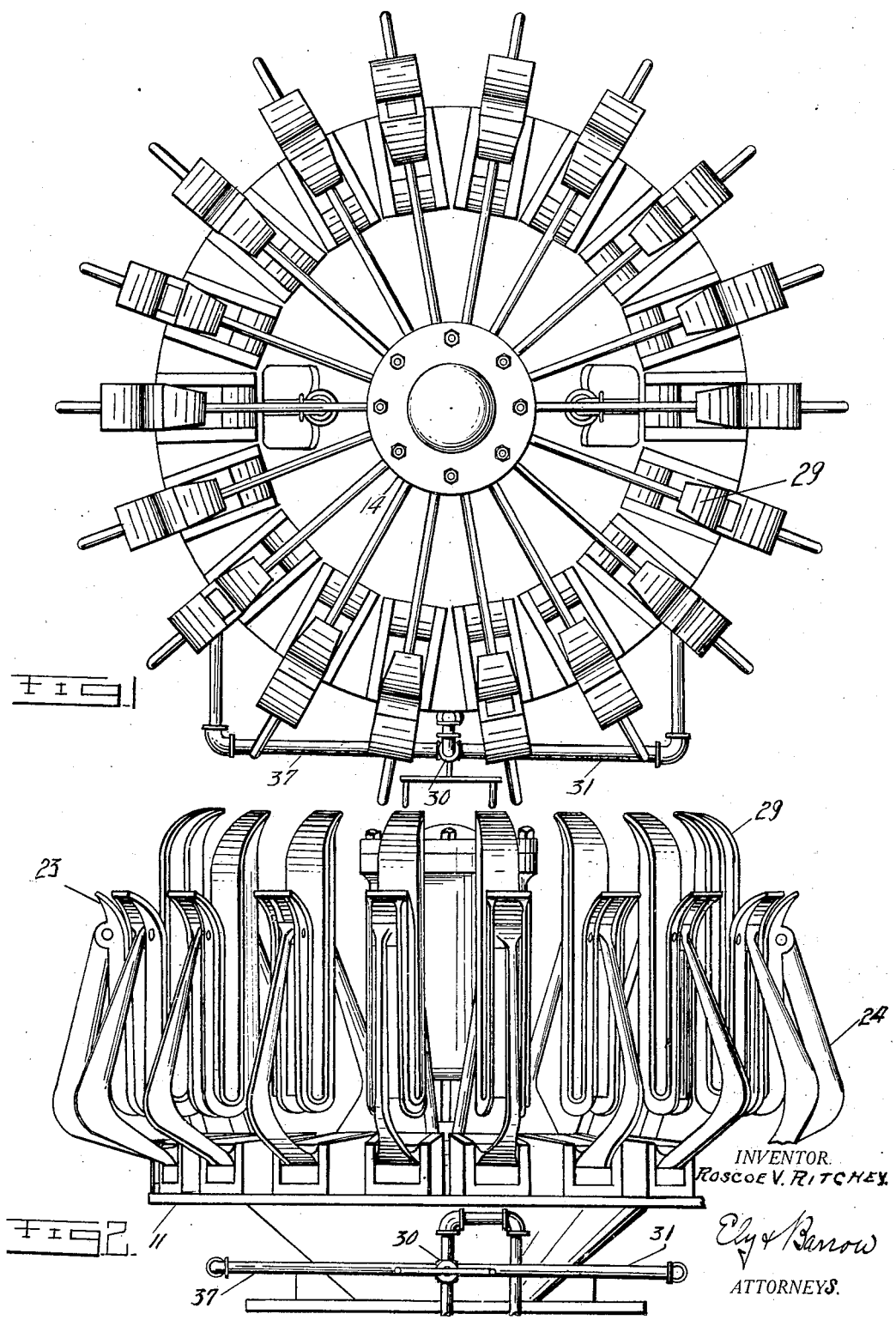
INVENTOR.
ROSCOE V. RITCHEY.
Ely & Barrow
ATTORNEYS.

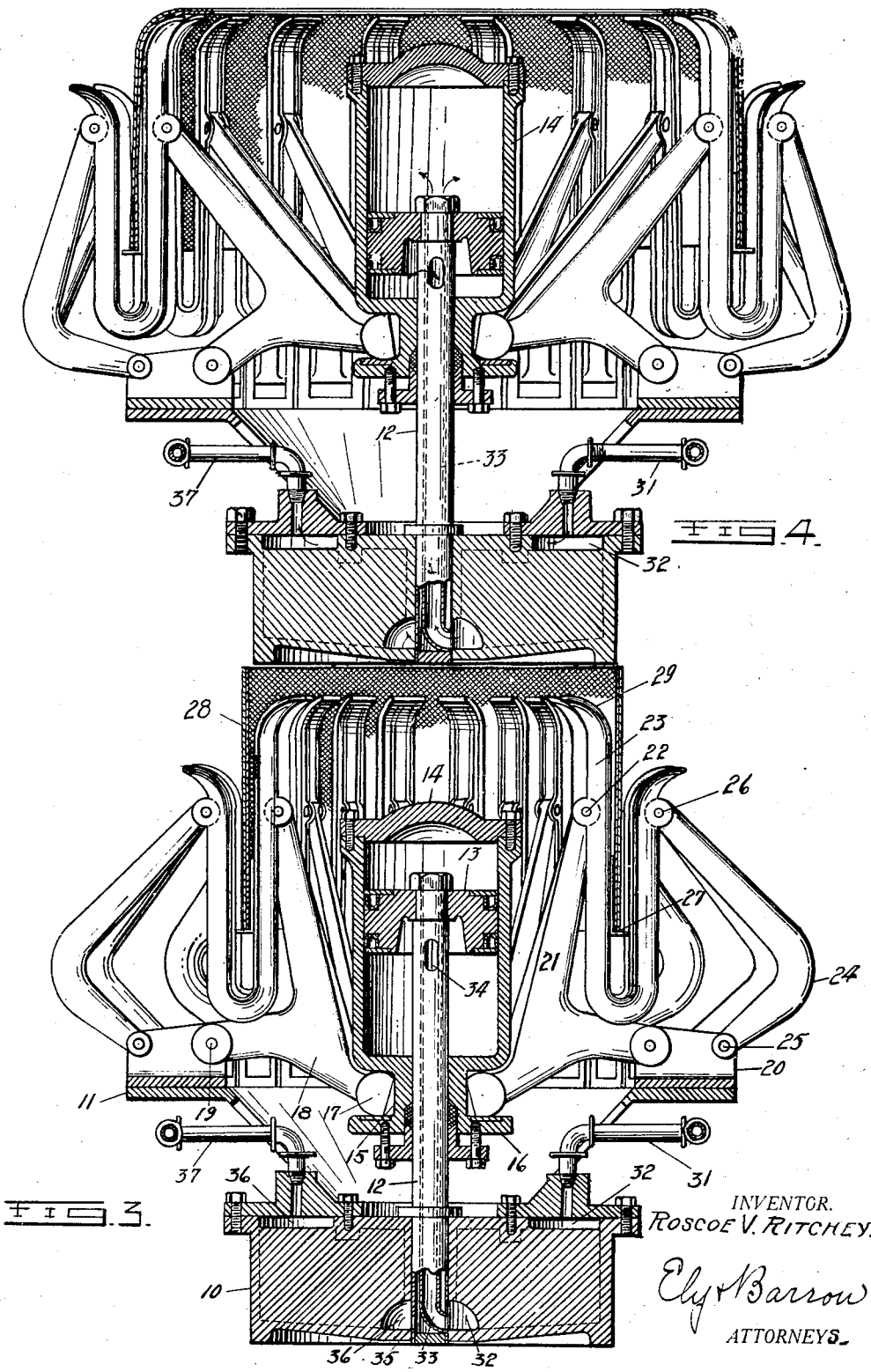

Patented June 24, 1930

1,768,332

UNITED STATES PATENT OFFICE

ROSCOE V. RITCHEY, OF AKRON, OHIO, ASSIGNOR TO THE FIRESTONE TIRE AND RUBBER COMPANY, OF AKRON, OHIO, A CORPORATION OF OHIO

FABRIC-BAND EXPANDER

Application filed November 17, 1927. Serial No. 233,887.

This invention relates to devices for stretching or expanding textile fabric bands and has particular reference to a machine for operating on the two-ply rubberized, bias-cut cord fabric bands, used in the manufacture of pneumatic automobile tires, the expanding operation facilitating the application of the plies about the tire building core.

An object of the invention is to devise a machine for uniformly stretching such fabric tire building bands to facilitate application of said bands about a tire building core. A further object of the invention is to devise an expanding device capable of operating on fabric bands for tires of large cross-section and small bead ring diameter.

The foregoing and other objects are obtained by the device illustrated in the drawings and described below. It is to be understood that the invention is not limited to the specific form thereof disclosed herein.

Of the accompanying drawings:

Figure 1 is a plan view of a device embodying the principles of the invention;

Figure 2 is a side elevation thereof;

Figure 3 is a vertical section of the device in contracted condition; and

Figure 4 is a vertical section of the device in expanded condition.

Referring to the drawings, 10 represents a base upon which a flange frame 11 is mounted. Tubular piston stem 12, affixed in base 10, projects vertically upwardly and carries at its upper end a piston 13 which is operable in a double-acting cylinder 14 reciprocable with respect thereto. Within an annular channel 15 defined by the bottom of the cylinder and a flange 16 integral therewith, are positioned the ends 17 of a plurality of rocker arms 18, radially mounted about said cylinder and pivoted at 19 to brackets 20 attached to said flange frame 11. Upper extensions 21 on the rocker arms are pivoted at 22 to one side of yokes 23, while a corresponding plurality of links 24, hinged at 25 to brackets 20, are pivoted at 26 to the opposite side of said yokes for maintaining the latter in parallel relationship while expanding or contracting. Adjustable brackets 27 attached to several of the yokes serve as stops to limit the extent to which a fabric band or tire ply 28 may be placed in the yokes. The inner arms of the yokes extend upwardly further than the outer arms and are provided with inwardly curved ends 29.

The device is operated by means of fluid pressure, preferably hydraulic, controlled by a four-way valve 30. In expanding the yokes, the fluid enters by way of pipe 31 to a conduit 32 formed in base 10, then flows into an inner tube 33 through piston stem 12 and into the upper end of cylinder 14 as illustrated by the arrows in Figure 4. At the same time, fluid from the lower end of the cylinder is exhausted by passing through an aperture 34 in the piston stem, flowing through said stem outside of the inner tube, out through an aperture 35 in the lower end of the stem, into a conduit 36 formed in base 10, and through pipe 37. To contract the yokes the direction of the fluid flow is reversed.

In the operation of the device, a tire band is positioned in the contracted yokes as illustrated in Figure 3, preferably with the upper margin of the band extending above the ends of the inner yoke arms. Fluid pressure is then introduced to the top of cylinder 14 to raise the latter and actuate rocker arms 18 to force the yokes radially outwardly expanding the band as illustrated in Figure 4. A suitable index or graduated dial (not shown) may be provided to indicate the degree to which the band is to be stretched. When the proper degree of expansion is reached, the pressure is admitted to the lower end of the cylinder, contracting the yokes and releasing the band. It will be noted that the band may be so positioned in the device that the upper margin of the band extends above the upper ends of the yokes, in order that when the band is expanded, the upper portion of the same is stretched about the curved ends 29 of the yokes and the margin is substantially unstretched, forming a radially inwardly directed portion to assist in centering the band on the tire building core.

The device has a wide range of operation and is particularly adapted for stretching bands for tires having a large cross-section and a relatively small bead diameter, such bands being originally formed with a small diameter and requiring an unusual degree of stretching to enable the band to be applied over a core of large cross-section.

Modifications of the structure herein disclosed may be resorted to without departing from the spirit of the invention or the scope thereof as defined by the appended claims.

What is claimed is:

1. A tire ply band stretching device, comprising a plurality of parallel yoke members, arranged about a central axis and radially movable with respect thereto, each of said yoke members having inner and outer arms, a plurality of links, each having one end pivoted to the outer arm of one of said yoke members, a plurality of rocker arms, each having one end pivoted to the inner arm of one of said members, a base to which are connected the other ends of said links and said rocker arms, a piston affixed to said base and extending along said central axis, and a fluid pressure operated cylinder reciprocable with respect to said piston and engageable with said rocker arms for expanding and contracting said yoke members to stretch a tire ply band placed thereabout.

2. A tire ply band stretching device, comprising a plurality of parallel U-shaped yoke members, arranged about a central axis and radially movable with respect thereto, means engaging the opposite legs of the yoke members for maintaining the same in parallel relation, and a fluid pressure operated cylinder reciprocable along said central axis and operatively connected to said yoke members for expanding the latter to stretch a tire ply band placed thereabout.

3. A tire ply band stretching device, comprising a plurality of yoke members, arranged in a cylindrical surface about a central axis and radially movable with respect thereto, and means for radially moving said yoke members with respect to said central axis to stretch a tire ply band placed thereabout.

4. A device of the class described comprising a fluid pressure operated reciprocable member, a plurality of movable arms arranged radially about the axis of said member, a portion of each of said arms being straight and the free ends of said arms being curved inwardly, and said member being reciprocable along said axis for urging said arms radially outwardly to expand a band placed thereabout and to cause a margin of said band to conform to the curved ends of said arm.

5. A tire ply band expanding device, comprising a plurality of movable arms having straight portions arranged to engage the inner surface of a tire ply band, one end of said arms being inwardly curved, means for relatively urging said arms apart to expand said ply band and to cause one margin of said band to conform to said curved ends, and means for maintaining the straight portions of said arms in parallel relation.

6. A tire ply band expanding device, comprising a plurality of movable arms arranged in a cylindrical surface to engage the inner surface of a tire ply band, means for urging said arms relatively apart to expand said ply band, and means for maintaining said arms in parallel relation.

7. A tire ply band stretching device, comprising a plurality of parallel U-shaped yoke members arranged about a central axis and radially movable with respect thereto, means engaging the opposite legs of the yoke members for maintaining the same in parallel relation, and means for radially moving said yoke members with respect to said central axis to stretch a tire ply band placed thereabout.

8. A tire ply band expanding device, comprising a plurality of movable arms having straight portions arranged in a cylindrical surface for engaging a tire ply band, inwardly curved extensions on one end of said arms, means for urging said arms relatively apart to expand said ply band and to cause one margin of said band to conform to said curved extensions, and means for gauging the proportion of the portion of the tire band which engages the curved extensions.

ROSCOE V. RITCHEY.